United States Patent [19]

Kueser et al.

[11] 4,305,328
[45] Dec. 15, 1981

[54] COFFEE VENDOR

[75] Inventors: John J. Kueser, Ballwin; Dean W. Fath, Overland, both of Mo.

[73] Assignee: UMC Industries, Inc., Stamford, Conn.

[21] Appl. No.: 70,918

[22] Filed: Aug. 29, 1979

[51] Int. Cl.³ .............................................. A47J 31/00
[52] U.S. Cl. ..................................... 99/283; 99/289 R
[58] Field of Search .......................... 99/279, 280–283, 99/288, 289 R, 295, 299

[56] References Cited

U.S. PATENT DOCUMENTS

| | | | |
|---|---|---|---|
| 3,338,153 | 8/1967 | Holstein et al. | 99/289 R |
| 3,379,117 | 4/1968 | Richeson | 99/289 R |
| 3,390,626 | 7/1968 | Holstein et al. | 99/289 R |
| 3,446,137 | 5/1969 | Pryor et al. | 99/289 R |
| 3,941,042 | 3/1976 | Wells et al. | 99/289 R |

*Primary Examiner*—Philip R. Coe
*Assistant Examiner*—Timothy F. Simone
*Attorney, Agent, or Firm*—Senniger, Powers, Leavitt and Roedel

[57] ABSTRACT

A coffee vendor comprising a brewer having a horizontal relatively small-mesh screen therein dividing the brewer into upper and lower chambers, a line for delivering hot water to the upper chamber of the brewer, a line for delivering filtered brewed coffee from the brewer, an air compressor for delivering compressed air to the upper chamber of the brewer, and a sanitizing system for cleaning the brewer and the delivery line. The sanitizing system includes a programmer motor for operation of the vendor through a sanitizing cycle comprising a series of successive hot-water rinse cycles. Switches operated by cams driven by the programmer motor program the sanitizing cycle, which is initiated by closure of a manual start switch, the cycle being automatically terminated. During each hot-water rinse cycle, hot water is delivered to the upper chamber of the brewer and then allowed to remain in the upper chamber for a time interval during which it seeps down through the screen into the lower chamber of the brewer and then into and through the delivery line. Compressed air is then delivered to the upper chamber of the brewer for a second time interval following the first time interval for forcing hot water remaining in the brewer out of the brewer through the delivery line.

10 Claims, 4 Drawing Figures

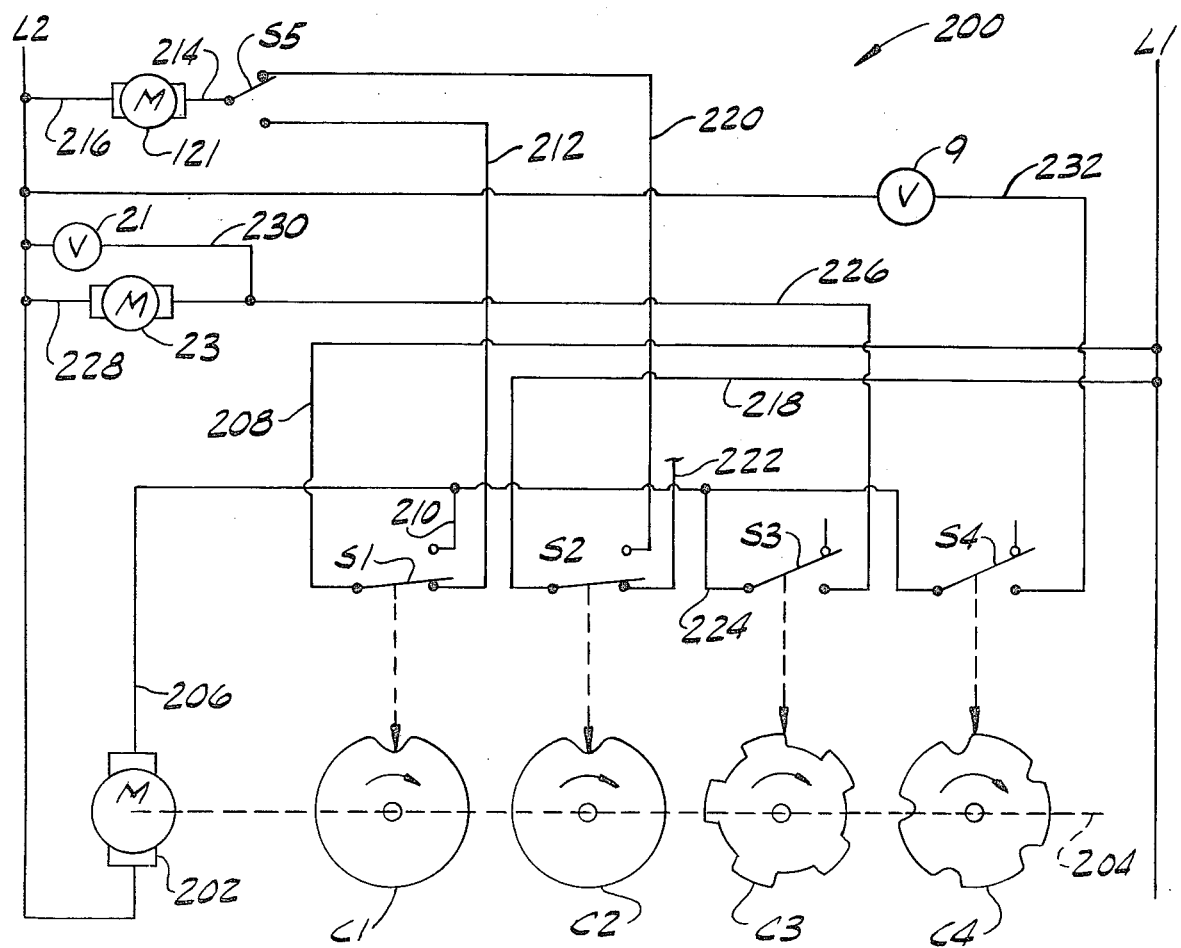

COFFEE VENDOR

BACKGROUND OF THE INVENTION

This invention relates to coffee vendors, i.e., vendors for brewing and vending coffee, and more particularly to a hot-water sanitizing system for such vendors.

The invention is especially concerned with vendors of the type having a brewer in which a cup of coffee is fresh-brewed from ground coffee in the brewer on each vend cycle. Reference may be made to the coassigned U.S Pat. No. 3,446,137, issued May 27, 1969, entitled Hot Beverage Merchandiser, for disclosure of the single-cup fresh-brew type to which the present invention is particularly applicable. For brewing good coffee, the brewer and delivery line for the brewed coffee should be thoroughly cleaned at frequent intervals. In the absence of a cleaning system, this has been a time-consuming operation, resulting in many instances in too infrequent thorough cleaning by servicemen with resultant vending of inferior coffee. More recently, coffee vendors sold by the assignee of this application have been equipped with cleaning systems, such as of the type described in coassigned U.S. Pat. Nos. 3,338,153 and 3,390,626, involving delivery of a charge of cleaning agent and hot water to the brewer for cleaning it. Although the operation of such cleaning systems has been generally satisfactory, the use of cleaning agents constitutes an added expense and requires that the vendor be equipped with a reservoir for the agent and apparatus for delivery of the agent to the brewer during a cleaning cycle.

SUMMARY OF THE INVENTION

Accordingly, among the several objects of this invention may be noted the provision of improved apparatus for cleaning the brewer of a fresh-brew coffee vendor, including thorough cleaning of the filter screens in the brewer, and the line for delivery of brewed coffee from the brewer; and the provision of such apparatus which eliminates the use of a cleaning agent to clean the brewer.

Generally, a vendor of the present invention for brewing and vending coffee comprises a brewer having a relatively small-mesh screen therein dividing the brewer into upper and lower chambers, a hot-water inlet above the screen, an outlet below the screen, means for delivering hot water to the upper chamber of the brewer through the hot-water inlet, a delivery line for delivering filtered brewed coffee from the brewer through the outlet, means for delivering compressed air to the upper chamber of the brewer for forcing brewed coffee down through the screen out of the brewer and into the delivery line, and a sanitizing system for cleaning the brewer and the delivery line. The sanitizing system comprises programming means for operation of the vendor through a sanitizing cycle comprising a series of successive hot-water rinse cycles. The programming means is operable during each rinse cycle for delivering hot water to the upper chamber of the brewer, for allowing hot water to remain in the chamber for a first time interval during which it seeps down through the screen into the lower chamber of the brewer and thence into and through the delivery line, and for delivering compressed air to the upper chamber of the brewer for a second time interval following said first time interval for forcing hot water remaining in the brewer out of the brewer and through the delivery line. Another of said successive hot-water rinse cycles begins after termination of the second time interval. Means is also provided for manually initiating operation of the programming means.

Other objects and features will be in part apparent and in part pointed out hereinafter.

BRIEF DESCRIPTION OF THE DRAWINGS

FIG. 3 is a wiring diagram; and

FIG. 4 is a chart showing the timing of operations during a sanitizing cycle.

Corresponding reference characters indicate corresponding parts throughout the several views of the drawings.

DESCRIPTION OF THE PREFERRED EMBODIMENT

Figure 1:
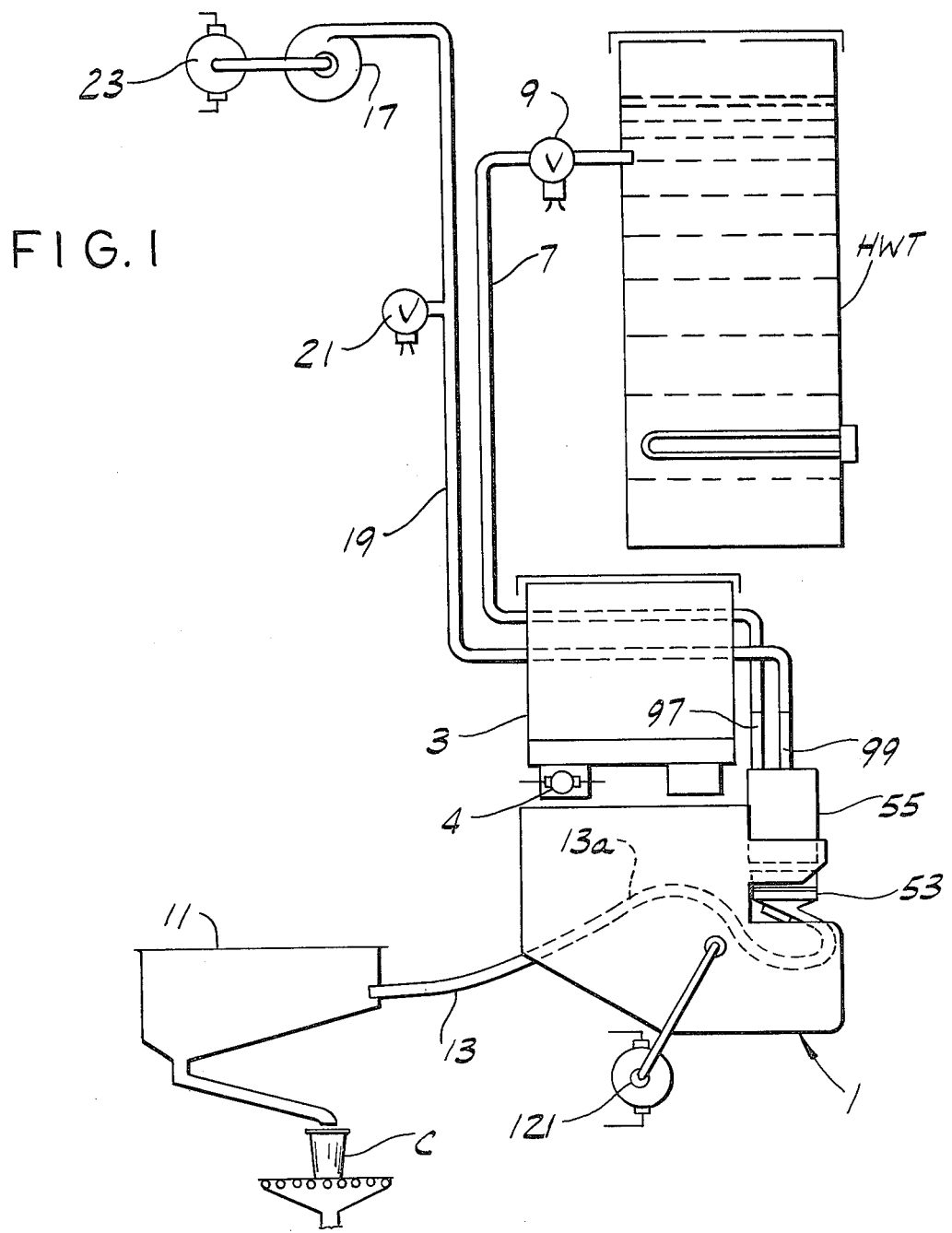
FIG. 1 is a diagrammatic view showing a coffee vendor equipped with a sanitizing system of this invention.

Referring to the drawings, first more particularly to FIG. 1, there is indicated at 1 a brewer which, except as noted below, is of essentially the same construction as the brewer 1 shown in the aforesaid U.S. Pat. No. 3,446,137. The brewer is adapted to receive a charge (a "throw") of ground coffee from a ground-coffee dispenser 3 driven by an electric motor 4 and also to receive a measured quantity of hot water (a cup of hot water) from a hot-water tank HWT for brewing a cup of coffee. The hot water is delivered to the brewer from the tank via a hot-water delivery line 7 which has a solenoid valve 9 therein adapted, when energized, to open the line for delivery of water. Brewed coffee is delivered from the brewer to a mixing bowl 11 via a delivery line 13 which, in contrast the brewer shown in U.S. Pat. No. 3,446,137, has no solenoid valve therein, thus allowing uninterrupted flow of brewed coffee from the brewer to the mixing bowl. An air compressor 17 is provided for delivering compressed air via a line 19 to the brewer to force brewed coffee from the brewer through line 13 to the mixing bowl 11. Line 19 is adapted to be vented to atmosphere to vent the brewer while the latter is being charged with hot water from tank HWT by means of a solenoid valve 21. This is normally open when deenergized, and is energized to close when compressor 17 is in operation so that line 19 and the brewer will then be pressurized. An electric motor for operating the compressor is indicated at 23.

Figure 2:
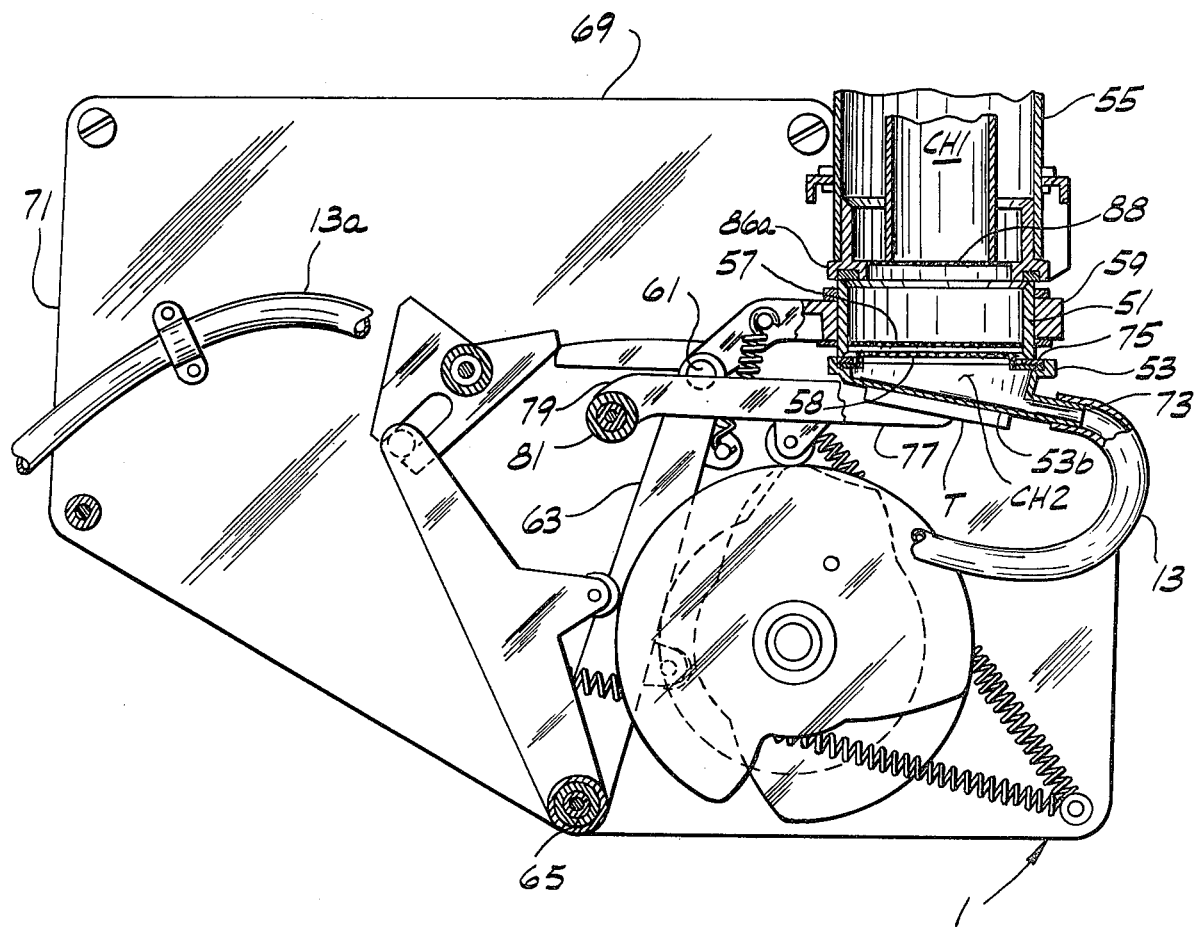
FIG. 2 is a view partly in side elevation and partly in vertical section of the brewer of the vendor.

The brewer 1 (see FIG. 2) comprises a cup 51 which holds a charge of ground coffee, a bottom closure or head 53 for the cup, and a brew vessel 55 above the cup. The cup 51 is of generally cylindrical form with a generally horizontal filter screen 57 of relatively small mesh (a 230-mesh polyester screen, for example) at its bottom for straining the brewed coffee. A metal screen 58 of larger mesh (such as a 40-mesh screen) at the top of the bottom head 53 underlies screen 57 when the head is clamped up against the cup for supporting it. This latter screen 58 is not included in the vendor of U.S. Pat. No. 3,446,137. The two screens, 57, 58 divide the brewer into upper and lower chambers designated CH1 and CH2, respectively, the upper chamber CH1 being defined by the brew vessel 55 and cup 51 and the lower chamber CH2 being defined by the bottom head 53. The cup 51 is secured at the free end of an arm 59 pivoted at 61 to the upper end of a shifter lever 63, the latter of which is pivoted at its lower end on a shaft 65 extending horizontally between side walls 69 (only one is shown) of a brewer chassis 71. The bottom closure 53 is in the form of a funnel having an inclined bottom wall 53*b* with an outlet 73, and is provided at its rim with a gasket 75 for sealing engagement with the bottom of cup 51. This bottom head or funnel 53 is adapted for up-and-down movement, being mounted between a pair of arms 77 of a lever 79 pivoted on a shaft 81. The funnel 53 is frictionally pivoted between arms 77. The vessel 55 is in the form of an inverted cylindrical cup open at its bottom, and is adapted to hold, in conjunction with cup 51, somewhat more than a cup of hot water. The vessel 55 has a metal screen 88 (of about the same mesh as screen 58) at its lower end and its bottom rim has a gasket 86*a* adapted for sealing engagement by the upper end of cup 51 when the latter is raised by the funnel 53. The vessel 55 has a check-valved hot-water inlet 97 at the top to which is connected the hot-water delivery line 7. It also has a port 99 at the top to which is connected the air line 19 from the air compressor 17. As shown in FIG. 2, the delivery line 13 for delivery of brewed coffee to the mixing bowl 11 is connected to the outlet 73 of funnel 53. For reasons which will appear hereinafter, this line 13 is supported (e.g., clamped) on a side wall 69 of the brewer chassis 71 with a portion 13*a* at an elevation generally the same as or higher than that of the small-mesh screen 57 in the brewer.

Except as noted above, the vendor thus far described is identical to that shown in U.S. Pat. No. 3,446,137, the corresponding parts thus far described bearing the same reference numerals as used in said patent. Reference may also be made to said patent for full details of the vendor, including the details as to the mechanism for operating the funnel 53 and the cup 51 and the circuitry therefor. The operation of the brewer of the present invention during a normal vend cycle is effected by a conventional motor (referred to as the brewer motor) indicated at 121, and is identical to that of the brewer described in said patent, except that the funnel 53 and the cup 51 occupy a different home position at the start of a vend cycle than that shown and described in said patent. It will be course be understood that the circuitry disclosed in said patent has been modified in a manner familiar to those skilled in this field for use in the present vendor to accomplish this result. Thus, in the normal operation of the vendor of this invention, at the start of a vend cycle, the funnel 53 and cup 51 occupy a home position in which the funnel is swung down from the bottom of the brew vessel 55 and the cup 51 is withdrawn from between the vessel and the funnel into a position for receiving a charge of ground coffee. After deposit of coin and actuation of one of a number of selector switches (not shown here, but fully shown in U.S. Pat. No. 3,446,137), the cup is loaded with a charge of ground coffee and moved into position between the brew vessel and the funnel (which is in a lowered position). The funnel is then raised to clamp the cup 51 against the bottom rim of vessel 55, as shown in FIG. 2. Valve 9 is opened for flow of hot water to vessel 55 where the hot water filters down through the screen 88, the fresh coffee grounds, and thence through the filter screens 57 and 58, the resultant coffee flowing out through the outlet 73 of funnel 53 into line 13 to the mixing bowl 11 and then to a cup C. The air compressor 17 is operated to force any remaining liquid out of the brewer and into the cup. Funnel 53 is subsequently swung down, and cup 51 is withdrawn from between the vessel and the funnel and flipped over to dump the spent coffee grounds. The cup is then swung back to its home position. Reference may be made to said U.S. Pat. No. 3,446,137 for details.

In accordance with the present invention, the vendor is equipped with a sanitizing system for cleaning the brewer 1 and the delivery line 13. This system comprises programming means, indicated generally at 200, for operation of the vendor through a sanitizing cycle in which the brewer is subjected to a series (e.g., five) of successive hot-water rinse cycles for cleaning both it and delivery line 13. As will appear, each of the successive rinse cycles involves the delivery of a charge of hot water to the upper chamber CH1 of the brewer when the latter is in its FIG. 2 position, and allowing the hot water to remain in the upper chamber for a time interval during which coffee deposits and other impurities on the inside surfaces of the brew vessel 55 and the cup 51 are dissolved. During this interval, hot water seeps down through screens 57, 58 into the lower chamber CH2 of the brewer (constituted by the interior of funnel 53) and thence into and through delivery line 13, thereby flushing both the lower chamber of the brewer and the delivery line for cleaning them. Compressed air is then delivered to the upper chamber of the brewer for forcing hot water remaining in the brewer out of the brewer and through the delivery line. FIG. 3 shows the control circuitry of the programming means 200, and FIG. 4 is a timing chart showing the duration and time of occurrence of various steps in a sanitizing cycle. As illustrated in FIG. 4, but by way of example only, five hot-water rinse cycles are involved in each sanitizing cycle, which lasts a total of about three minutes or about 180 seconds.

Programming means 200 comprises a programming timing motor 202 and four double-throw switches controlled by cams on a cam shaft 204 driven by this motor. These switches, all of which are normally closed on their lower contacts, are designated S1, S2, S3 and S4, and the respective cams are designated C1, C2, C3 and C4 (FIG. 3). Reference characters L1 and L2 designate main power lines. The timing motor 202, connected at one terminal to line L2 and at its other terminal to a line 206, is set into operation to start a sanitizing cycle by the manual closure of switch S1, which is a manual start switch and is automatically deenergized upon termination of the 180-second sanitizing cycle. During the sanitizing cycle, the motor drives cams C1–C4 through a single revolution and these cams operate switches S1–S4 to control various operations of the vendor during the cycle, as will appear.

Switch S1 has its movable contactor connected by a line 208 to line L1, its normally open upper contact connected by a line 210 to line 206 of the timing motor, and its normally closed lower contact connected by a line 212 to the lower contact of a brewer cycle switch S5, the latter of which is a double-throw switch controlled by a cam (not shown) on a cam shaft (not shown) driven by the brewer motor 121. The contactor of the brewer cycle switch S5 is connected by a line 214 to one terminal of the brewer motor, the other terminal being connected to power line L2 by a line 216. Reference may be made to said U.S. Pat. No. 3,446,137 for full details of the brewer motor circuitry. On manual closure of the switch S1 on its upper contact, a circuit comprising lines L1 and 208, switch S1, lines 210 and 206, the timing motor 202 and line L2 is established to energize the timing motor. The cam C1 on cam shaft 204, driven by the timing motor, is formed to hold switch S1 closed for a full revolution of the cam (i.e., during a full 180-second sanitizing cycle), whereupon the switch automatically closes back down on its lower contact to deenergize the timing motor.

Switch S2 controls operation of the brewer motor 121 and has its movable contactor connected by a line 218 to line L1, its normally open upper contact connected by a line 220 to the upper contact of the brewer cycle switch S5, and its normally closed lower contact connected by a line 222 to the machine selection and vend circuit of the vendor, details of which circuit are not shown here but which are disclosed in detail in U.S. Pat. No. 3,446,137. Cam C2 is formed to close switch S2 on its normally open upper contact at the start of a sanitizing cycle, thereby establishing a circuit comprising lines L1 and 218, switch S2, line 220, switch S5 (which is closed on its upper contact at the start of a sanitizing cycle), line 214, the brewer motor 121, and lines 216 and L2 to energize the brewer motor 121. The cam C2 is developed to hold the switch S2 on its upper contact for a full revolution of the cam, whereupon the switch automatically closes back down on its lower contact.

Switch S3 controls operation of the compressor motor 23 and the solenoid of the vent valve 21. This switch has its movable contactor connected by a line 224 to line 206 and its normally closed lower contact connected by a line 226 to one terminal of the compressor motor 23, the other terminal being connected by a line 228 to power line L2. The vent valve 21 is connected in parallel with the compressor motor by a line 230. The normally open upper contact of switch S3 is unconnected. Cam C3, which controls switch S3, is developed and phased to close switch S3 on its upper unconnected contact on start-up of the timing motor and to hold the switch in that position until about the 24th second of the cycle. The switch then drops on its normally closed lower contact which establishes a circuit to close vent valve 21 and to operate the motor 23 for driving the air compressor 17 to deliver compressed air via line 19 to the upper chamber CH1 of the brewer. The cam C3 is formed for the switch S3 to remain closed on its lower contact from about the 24th to about the 36th second of the sanitizing cycle, or a total of about 13 seconds, after which time the cam raises the contactor to open switch S3 for deenergizing the compressor motor and the solenoid in the vent valve to open the latter to vent the brewer. The switch S3 is held by cam C3 on its upper contact for about the next 24 seconds (i.e., from about the 37th to the 60th second of the sanitizing cycle), whereupon the switch again drops to its lower contact for reactivating the compressor motor and closing the vent valve. As shown in FIG. 3, cam C3 is formed for repeating this cycle (wherein the compressor motor and the solenoid of the vent valve are deenergized for about a 24-second interval and then energized for about a 13-second interval) five times during a sanitizing cycle, although it will be understood that this number may vary without departing from the scope of this invention.

Switch S4, connected in series with switches S3 and S1, controls operation of solenoid valve 9 in line 7 for delivery of hot water from the hot-water tank HWT to the brewer 1. This switch S4 has its movable contactor connected to line 206 and its normally closed lower contact connected via line 232 to power line L2. The brewer water valve 9 is in line 232. The normally open upper contact of the switch S4 is unconnected. Cam C4, which controls the operation of switch S4, is developed and so phased in relation to cam C3 to close switch S4 on its lower contact for energizing the solenoid in the brewer water valve 9 to open it for delivery of hot water to the brewer during the intervals in which cam C3 is holding switch S3 on its upper contact (i.e., when the air compressor motor is deenergized and the vent valve is open). More specifically, on start-up of the timing motor to initiate the sanitizing cycle, the cam C4 holds the switch S4 open, the solenoid of the brewer water valve 9 thus being deenergized and the valve 9 closed. The cam C4 holds switch S4 open for about the first one to two seconds of the sanitizing cycle, whereupon the switch drops down to close on its lower contact to energize the solenoid of the brewer water valve to open the valve for delivery of hot water to the brewer. Cam C4 is formed for the switch S4 to remain closed on its lower contact for about a 5-second interval (from about the third to about the seventh second of the sanitizing cycle), after which time the cam opens the switch to close the brewer water valve 9. The cam C4 is designed to hold the switch open for about the next 32 seconds (from about the 8th to about the 40th second of the sanitizing cycle) and then to allow the switch to again drop back down to its lower contact for opening the brewer water valve 9. As shown in FIG. 4, this cycle of energizing and deenergizing the solenoid of the brew-water valve 9 to open and close the valve is repeated five times during a sanitizing cycle, although this number may vary.

Operation is as follows:

Following any vend cycle, the funnel 53 and cup 51 of the brewer occupy a home position in which the funnel is swung downwardly from the bottom of the brew vessel 55 and the cup 51 is withdrawn from between the vessel and the funnel into a position for receiving a charge of ground coffee. A sanitizing cycle is initiated with the funnel 53 and cup 51 in this position by closing the manual start switch S1 on its upper contact, thereby establishing a circuit between power lines L1 and L2 for energizing the timing motor 202, which then drives the cam shaft 204 to rotate cams C1-C4 in clockwise direction as viewed in FIG. 3. The cams are shown in FIG. 3 in their home positions, that is, in their positions at the start of a sanitizing cycle. After the initial manual closure of switch S1, cam C1 holds the switch closed on its upper contact through a 180-second 360° revolution of the cam shaft. On rotation of the cam shaft 204, cam C2 closes switch S2 on its upper contact and holds it in that position for the remainder of the sanitizing cycle. On closure of switch S2 on its upper contact, the brewer motor 121 is energized (switch S5 being on its upper contact) to operate the vendor mechanism to move cup 51 into position between vessel 55 and funnel 53 and then to raise the funnel to clamp the cup against the bottom of the vessel 55 (see FIG. 2). Coffee dispensing motor 4 is not energized so that a charge of coffee is not dumped into cup 51 prior to its moving to its FIG. 2 position. After the brewer has assumed its FIG. 2 position (within the first one to two seconds after closure of the manual switch S1), a cam on the brewer motor cam shaft (not shown) closes the brewer full-cycle switch S5 on its lower contact, thereby deenergizing the brewer motor so that the funnel 53 and cup 51 remain tightly clamped up against the brewer vessel 55 during the remainder of the sanitizing cycle. During these initial seconds of the sanitizing cycle, cams C3 and C4 hold their respective switches S3 and S4 open, the air compressor motor 23 thus being deenergized, the vent valve 21 open, and the brewer water valve 9 closed. At about the third second of the sanitizing cycle, cam C4 closes switch S4 on its lower contact for energization of the solenoid of the brewer water valve 9 for delivery, via line 7 and inlet port 97, of hot water from the hot-water tank HWT to the upper chamber CH1 of the brewer.

At about the seventh second of the cycle, at which time a sufficient quantity of water (e.g., nine ounces) has been delivered substantially to fill the brewer, cam C4 opens switch S4, thereby breaking the circuit to the solenoid of valve 9 to close it to shut off the supply of hot water to the brewer. Inasmuch as the screen 57 at the bottom of the cup 51 is of relatively fine mesh (e.g., 230 mesh) and in that the delivery line 13 is supported in the vendor with a portion 13a at an elevation generally the same as that of the screen 57, the hot water drains relatively slowly from the upper chamber CH1 of the brewer (i.e., from the brewer vessel 55 and cup 51), thus allowing the hot water to remain in the upper chamber of the brewer for approximately the next 16 seconds of the sanitizing cycle (i.e., from about the eighth second to the 24th second of the cycle) for dissolving coffee deposits and other impurities from the inside surfaces of the brewer vessel 55 and cup 51. During this cleaning interval, hot water seeps down relatively slowly through the small-mesh screen 57 and the relatively large-mesh 58 screen therebelow into the funnel 53 (constituting the lower chamber CH2 of the brewer) and thence into the delivery line 13 to the mixing bowl 11. This flushes the lower chamber of the brewer and the delivery line and cleans them.

At about the 24th second of the cycle, cam C3 allows switch S3 to close on its lower contact to close the vent valve 21 and to energize the compressor motor 23 for delivery of compressed air via line 19 and port 99 to the brewer to force hot water in the brewer out of the brewer into line 13 to the mixing bowl.

At about the 36th second of the sanitizing cycle, the cam C3 opens switch S3, thereby breaking the circuit to the compressor motor and vent valve for deenergizing the motor and opening the valve to vent the brewer. This completes the first of five successive rinse cycles of the sanitizing cycle.

At about the 40th second of the cycle, switch S4 closes on its lower contact to open the brewer water valve 9 for delivery of another charge of hot water to the upper chamber CH1 of the brewer, the switch being opened by cam C4 at about the 44th second of the cycle to close the valve 9 after the brewer has been substantially filled with hot water.

Hot water is held in the upper chamber of the brewer with seepage down through the fine-mesh screen 57 at the bottom of the brew vessel 55 from about the 45th to the 60th second of the cycle, after which time the movable contactor of switch S3 again drops to its lower contact to close the vent valve 21 and to operate the air compressor motor for about a 13-second interval (i.e., from about the 60th to the 72nd second of the cycle) to clear the brewer of all hot water therein. The switch S3 is then opened by its cam C3 to deenergize the compressor motor and to open the vent valve for venting the brewer, thus completing the second rinse cycle.

At about the 76th second of the cycle, switch S4 closes on its lower contact to open the brewer water valve 9 for delivery of another charge of hot water to the upper chamber CH1 of the brewer. At about the 80th second, the movable contactor of the switch S4 is raised by cam C4 to shut off the delivery of hot water to the brewer, which is substantially filled at this time.

During the 81st to the 96th second of the sanitizing cycle the hot water stands in the upper chamber CH1 of the brewer to clean it, with water seeping slowly down through the small-mesh screen 57 at the bottom of the vessel 55. The switch S3 then closes on its lower contact to close the vent valve 21 and to operate the air compressor motor 23 for about a 13-second interval (i.e., from about the 96th to the 180th second of the cycle) to clear the brewer of all hot water therein. Cam C3 then forces the switch S3 open to deenergize the compressor motor and to open the vent valve for venting the brewer. This completes the third rinse cycle.

At about the 112th second of the cycle, switch S4 closes on its lower contact to open the brewer water valve 9 for delivery of hot water to the upper chamber CH1 of the brewer, the switch being opened by cam C4 at about the 116th second of the cycle to close the valve 9.

Hot water remains in the upper chamber of the brewer, with water seeping slowly down through the fine-mesh screen 57, from the 117th to the 132nd seconds of the sanitizing cycle. The movable contactor of switch S3 then drops onto its lower contact at about the 132nd second of the cycle to close the vent valve 21 and to operate the air compressor motor 23 for delivery of air to the brewer to force the water out of the brewer into the delivery line to the mixing bowl. This continues until about the 144th second of the cycle, at which time switch S3 is opened by cam C3 to deenergize the compressor motor 23 and to open the vent valve 21, thus completing the fourth rinse cycle.

At about the 148th second of the cycle, switch S4 closes on its lower contact to open the brewer water valve 9 for delivery of hot water to the brewer for the fifth and last rinse cycle, the switch being opened by cam C4 at about the 152nd second of the cycle to close the brewer water valve.

Hot water is held in the upper chamber CH1 of the brewer with seepage down through the fine-mesh screen 57 from about the 153rd to the 168th second of the sanitizing cycle. At about the 168th second of the cycle, the movable contactor of switch S3 drops onto its lower contact to close vent valve 21 and to operate air compressor motor 23 for about a 13-second interval (i.e., to about the 180th second of the cycle) to clear the brewer of all hot water therein. The switch S3 is then opened by cam C3 to deenergize the compressor motor and top open the vent valve. This completes the fifth and last (as herein illustrated) rinse cycle.

At about the 180th second of the cycle, all four cams C1–C4 arrive at their home positions (shown in FIG. 3). In reaching its home position, cam C1 permits the movable contactor of switch S1 to drop to is lower contact. This deenergizes the timing motor 202 and energizes the brewer motor 121 (since the brewer full-cycle switch S5 is on its lower contact) to operate the brewer mechanism to swing the funnel 53 down, to withdraw cup 51 from between the vessel 55 and the funnel, to flip the cup over to dump any debris which may have collected on screens 57, 58 and to swing the cup back to its home position in which it is ready for a subsequent vend cycle. As the cup 51 reaches its home position, a cam on the brewer motor cam shaft (not shown) closes switch S5 on its upper contact, thereby deenergizing the brewer motor. It will be noted that there is no circuit to the brewer motor through switch S2, since that switch, on rotation of the cam C2 to its home position, has dropped from its upper to its lower contact.

The sanitizing system of this invention, with its five separate hot-water rinse cycles (this number may vary), is advantageous in that it eliminates the need to use a cleaning agent to clean the brewer 1 and delivery line 13 downstream therefrom. This is desirable in that it reduces the cost of cleaning the brewer and, moreover, dispenses with apparatus for storing a cleaning agent and delivering it to the brewer, which apparatus consumes a considerable amount of space in the vendor. And yet, despite the fact that the cleaning system of the present invention does not use a cleaning agent, it has been found to achieve excellent cleaning results which approximate those achieved by cleaning systems using a cleaning agent.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vendor for brewing and vending coffee comprising a brewer having a relatively small-mesh screen therein dividing the brewer into upper and lower chambers, a hot-water inlet above the screen, an outlet below the screen, means for delivering hot water to the upper chamber of the brewer through the hot-water inlet, a delivery line for delivering filtered brewed coffee from the brewer through said outlet, means for delivering compressed air to the upper chamber of the brewer for forcing brewed coffee down through the screen out of the brewer and through said delivery line, and a sanitizing system comprising programming means for operation of the vendor through a sanitizing cycle comprising a series of at least two successive hot-water rinse cycles, said programming means being operable during each rinse cycle for delivering hot water to the upper chamber of the brewer, for allowing the hot water to remain in the upper chamber for a first time interval during which it seeps down through said screen into the lower chamber of the brewer and thence into and through the delivery line for rinsing and cleansing both the brewer and delivery line, and for delivering compressed air to the upper chamber of the brewer for a second time interval following said first time interval for forcing hot water remaining in the brewer out of the brewer and through the delivery line, another of said successive hot-water rinse cycles beginning automatically after termination of said second time interval, and means for initiating operation of said programming means to begin said sanitizing cycle to sanitize said brewer and delivery line.

2. A coffee vendor as set forth in claim 1 wherein said initiating means comprises a manually operable switch.

3. A coffee vendor as set forth in claim 1, wherein a portion of said delivery line is supported at an elevation approximately the same as or greater than that of said small-mesh screen thereby to ensure that the hot-water rinses drain relatively slowly from the upper chamber of the brewer for thoroughly rinsing the latter.

4. A coffee vendor as set forth in claim 3, wherein said programming means is adapted to operate the vendor through a series of five successive hot-water rinse cycles.

5. A coffee vendor as set forth in claim 1, wherein said programming means is adapted to operate the vendor through a series of at least three successive hot-water rinse cycles.

6. A vendor for brewing and vending coffee comprising a brewer adapted to be opened for reception of a charge of coffee and closed for brewing a cup of coffee therein, said brewer being operable through a vend cycle in which it is open at the start of the cycle without a charge of coffee therein, and subsequently closed with a charge therein, hot water is delivered to the brewer for brewing a cup of coffee, and compressed air is delivered to the brewer for forcing brewed coffee out of the brewer, said brewer then being adapted to be opened for dumping the spent charge of coffee, the brewer having a relatively small-mesh screen therein dividing the brewer into upper and lower chambers, a hot-water inlet above the screen, and an outlet below the screen, said vendor further comprising means for delivering hot water to the upper chamber of the brewer through the hot-water inlet, a delivery line for delivering filtered brewed coffee from the brewer through said outlet, means for delivering compressed air to the upper chamber of the brewer for forcing brewed coffee down through the screen out of the brewer and through said delivery line, and a sanitizing system comprising programming means for closing the brewer without a charge of coffee therein, for operation of the vendor with the brewer closed through a sanitizing cycle, and for opening the of the vendor through a sanitizing cycle comprising a series of at least two successive hot-water rinse cycles, said programming means being operable during each rinse cycle for delivering hot water to the upper chamber of the brewer, for allowing the hot water to remain in the upper chamber for a first time interval during which it seeps down through said screen into the lower chamber of the brewer and thence into and through the delivery line for rinsing and cleansing both the brewer and delivery line, and for delivering compressed air to the upper chamber of the brewer for a second time interval following said first time interval for forcing hot water remaining in the brewer out of the brewer and through the delivery line, another of said successive hot-water rinse cycles beginning automatically after termination of said second time interval, and means for initiating operation of said programming means to begin said sanitizing cycle to sanitize said brewer and delivery line.

7. A coffee vendor as set forth in claim 6 wherein said initiating means comprises a manually operable switch.

8. A coffee vendor as set forth in claim 6, wherein a portion of said delivery line is supported at an elevation approximately the same as or greater than that of said small-mesh screen thereby to ensure that the hot-water rinses drain relatively slowly from the upper chamber of the brewer for thorough rinsing of the latter.

9. A coffee vendor as set forth in claim 6, wherein said programming means is adapted to operate the vendor through a series of at least three successive hot-water rinse cycles.

10. A coffee vendor as set forth in claim 9, wherein said programming means is adapted to operate the vendor through a series of five successive hot-water rinse cycles.

* * * * *

UNITED STATES PATENT AND TRADEMARK OFFICE
CERTIFICATE OF CORRECTION

PATENT NO. : 4,305,328

DATED : December 15, 1981

INVENTOR(S) : John J. Kueser et al.

It is certified that error appears in the above—identified patent and that said Letters Patent is hereby corrected as shown below:

On the title page, Abstract, line 19, "then" should read -- thence --. Column 8, line 52, "top open" should read -- to open --. Column 10, claim 6, line 34, "for opening the of the vendor through a sanitizing cycle" should read -- for opening the brewer after completion of said sanitizing cycle prior to a subsequent vend, said sanitizing cycle --.

Signed and Sealed this

Eighth Day of June 1982

|SEAL|

Attest:

Attesting Officer

GERALD J. MOSSINGHOFF

Commissioner of Patents and Trademarks